(12) United States Patent
Meeker et al.

(10) Patent No.: US 7,229,132 B2
(45) Date of Patent: *Jun. 12, 2007

(54) FOLDABLE BOOSTER CAR SEAT

(75) Inventors: Paul Meeker, Hiram, OH (US); William R. Gibson, Kent, OH (US)

(73) Assignee: Meeker R & D, Inc., Hiram, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/259,097

(22) Filed: Sep. 27, 2002

(65) Prior Publication Data

US 2004/0061366 A1    Apr. 1, 2004

(51) Int. Cl.
*A47D 1/10*    (2006.01)
*B60N 2/00*    (2006.01)

(52) U.S. Cl. ................ 297/250.1; 297/255; 297/378.1; 297/378.12

(58) Field of Classification Search ............ 297/250.1, 297/255, 256.1, 17, 378.1, 378.12, 378.14, 297/331
See application file for complete search history.

(56) References Cited

U.S. PATENT DOCUMENTS

| | | | | |
|---|---|---|---|---|
| 2,461,367 A | | 2/1949 | Bonk ........................... | 155/79 |
| 2,508,822 A | | 5/1950 | Goldberg ...................... | 155/10 |
| 2,548,016 A | | 4/1951 | Goldberg ...................... | 155/79 |
| 2,634,794 A | | 4/1953 | Young .......................... | 155/79 |
| 2,924,266 A | | 2/1960 | Goldbert ....................... | 155/79 |
| 4,079,992 A | * | 3/1978 | Thrift et al. ............. | 297/183.5 |
| 4,251,100 A | * | 2/1981 | Rolandelli ................... | 296/63 |
| 4,540,216 A | * | 9/1985 | Hassel, Sr. .................. | 297/238 |
| 4,570,510 A | | 2/1986 | Babak et al. | |
| 4,640,550 A | | 2/1987 | Hakansson .................. | 297/483 |
| 4,746,166 A | * | 5/1988 | Sadan ......................... | 297/17 |
| 4,818,023 A | | 4/1989 | Griesemer .................. | 297/483 |
| 4,854,639 A | | 8/1989 | Burleigh et al. | |
| 4,986,600 A | | 1/1991 | Leblanc et al. ............. | 297/238 |
| 5,018,788 A | * | 5/1991 | Cedergreen .............. | 297/378.1 |
| 5,158,337 A | | 10/1992 | Leggett ...................... | 297/250 |
| 5,169,174 A | | 12/1992 | Gray .......................... | 280/808 |
| 5,190,344 A | * | 3/1993 | Anderson et al. ............. | 297/17 |
| 5,366,271 A | | 11/1994 | Johnston et al. ............ | 297/250 |
| 5,378,038 A | * | 1/1995 | Koyanagi et al. ....... | 297/256.13 |
| 5,395,154 A | * | 3/1995 | Wang ......................... | 297/130 |
| 5,413,401 A | * | 5/1995 | Koyanagi ................ | 297/250.1 |
| 5,460,426 A | * | 10/1995 | Tribelsky et al. ............. | 297/17 |
| 5,472,236 A | | 12/1995 | Gray .......................... | 280/808 |
| 5,496,092 A | * | 3/1996 | Williams et al. ......... | 297/250.1 |
| 5,551,751 A | | 9/1996 | Sedlack et al. ............. | 297/256 |
| 5,564,780 A | | 10/1996 | Presser et al. ............. | 297/238 |
| 5,580,125 A | * | 12/1996 | Alger ...................... | 297/250.1 |
| 5,658,047 A | * | 8/1997 | Ratza et al. ........... | 297/378.14 |
| 5,678,887 A | * | 10/1997 | Sher ........................ | 297/250.1 |

(Continued)

FOREIGN PATENT DOCUMENTS

DE          4137599         5/1993

(Continued)

*Primary Examiner*—Peter M. Cuomo
*Assistant Examiner*—Sarah B. McPartlin
(74) *Attorney, Agent, or Firm*—Buckingham, Doolittle & Burroughs LLP; Louis F. Wagner

(57) ABSTRACT

The invention relates generally to a foldable or collapsible juvenile car seat.

44 Claims, 10 Drawing Sheets

U.S. PATENT DOCUMENTS

| | | | |
|---|---|---|---|
| D387,934 S * | 12/1997 | Bear | D6/598 |
| 5,722,731 A | 3/1998 | Chang | 297/473 |
| 5,733,004 A | 3/1998 | Celestina-Krevh et al. | 297/250 |
| 5,769,495 A | 6/1998 | Vairinen | |
| 5,785,383 A | 7/1998 | Otero | 297/255 |
| 5,803,543 A | 9/1998 | Hartmann | |
| 5,820,221 A * | 10/1998 | Greaves et al. | 297/378.14 |
| 5,845,967 A | 12/1998 | Kane et al. | 297/250 |
| 5,964,502 A | 10/1999 | Stephens | 297/250 |
| 5,997,098 A * | 12/1999 | Coffeen | 297/483 |
| 6,015,190 A * | 1/2000 | Wend | 297/378.1 |
| 6,079,780 A | 6/2000 | Bapst | 297/250 |
| 6,155,638 A | 12/2000 | Bapst | 297/250 |
| 6,189,973 B1 * | 2/2001 | Wu | 297/378.1 |
| 6,196,629 B1 | 3/2001 | Onishi et al. | 297/256 |
| 6,336,682 B1 | 1/2002 | Rosko | 297/483 |
| 6,491,348 B1 | 12/2002 | Kain | |
| 6,592,183 B2 * | 7/2003 | Kain | 297/253 |
| 6,685,266 B2 * | 2/2004 | James et al. | 297/250.1 |
| 2002/0033632 A1 | 3/2002 | Gibson et al. | 297/483 |
| 2002/0190547 A1 | 12/2002 | Kain | |
| 2003/0067198 A1 * | 4/2003 | Treen et al. | 297/250.1 |
| 2003/0090134 A1 | 5/2003 | James et al. | |
| 2004/0084938 A1 * | 5/2004 | Tomas et al. | 297/250.1 |

FOREIGN PATENT DOCUMENTS

| | | |
|---|---|---|
| WO | WO 02/06091 | 1/2002 |

* cited by examiner

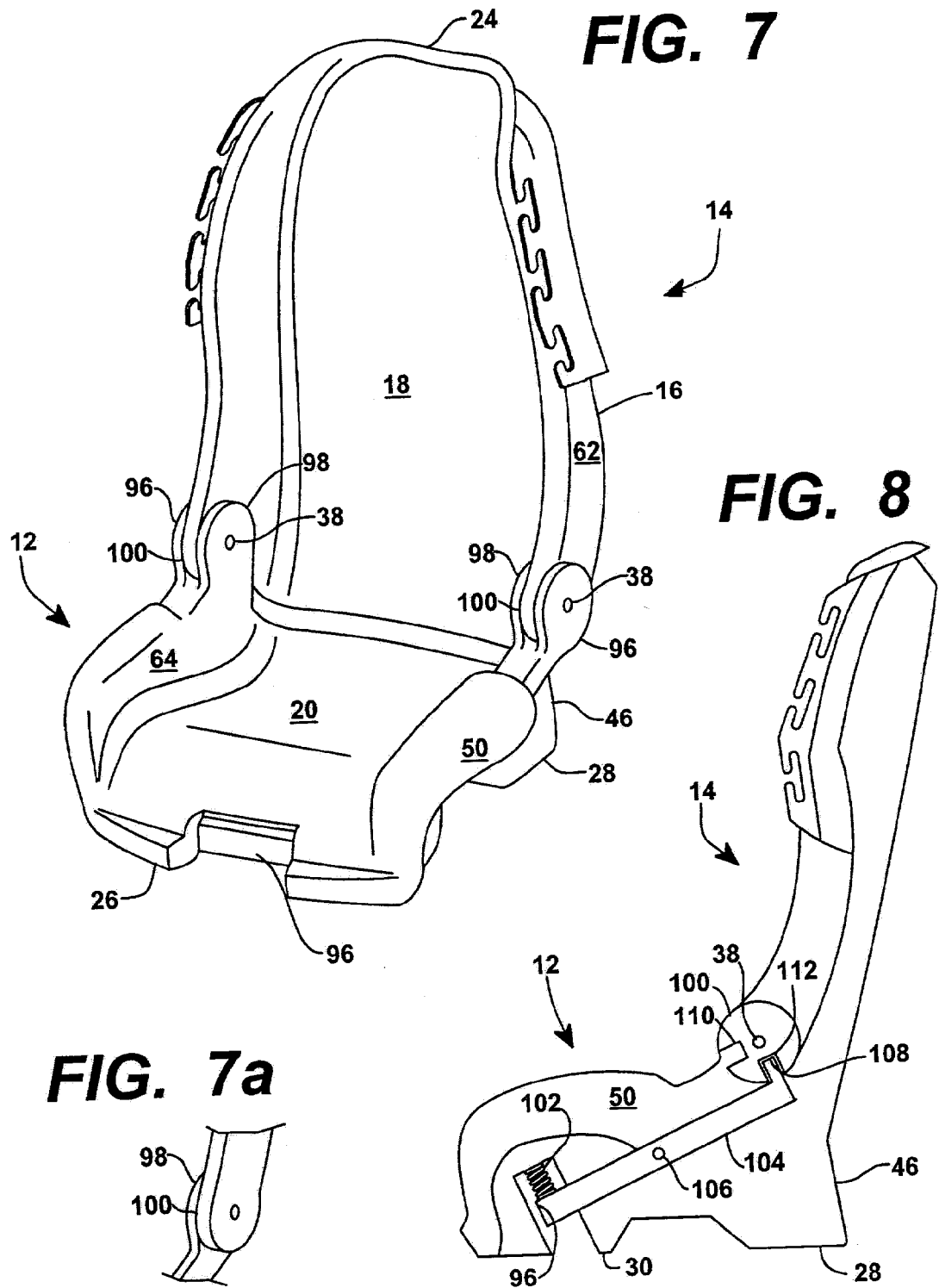

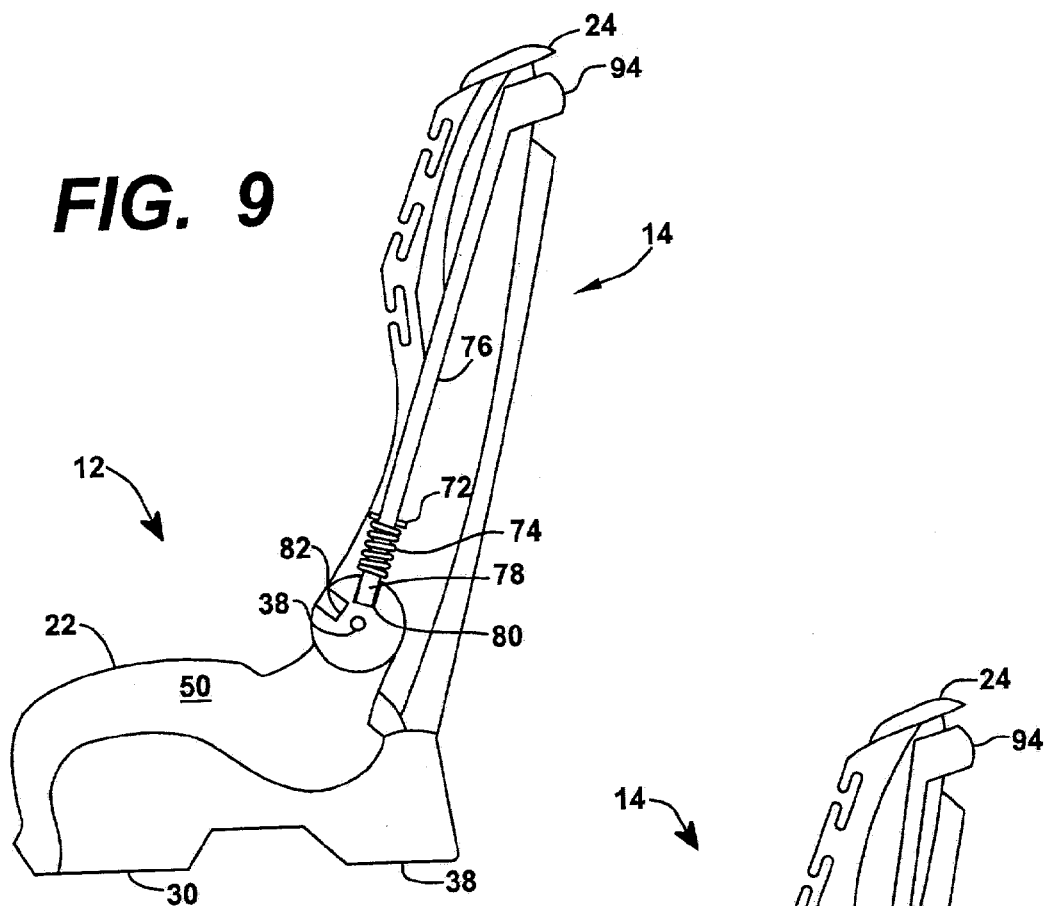
FIG. 9
FIG. 10
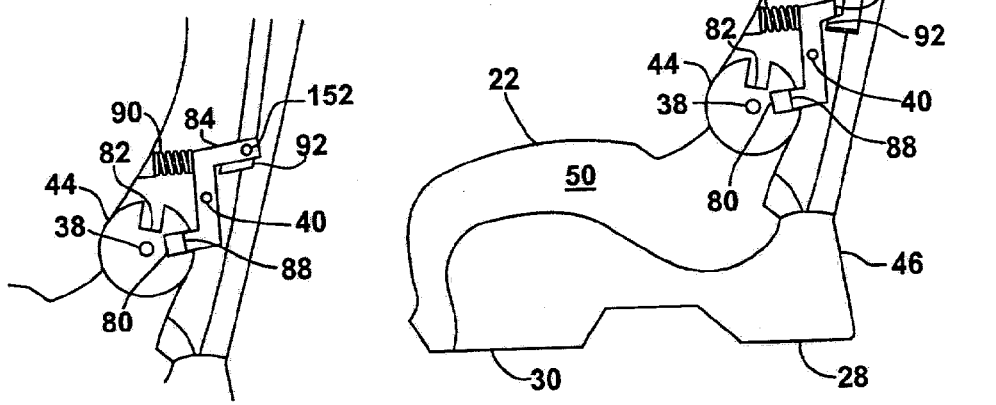
FIG. 10a

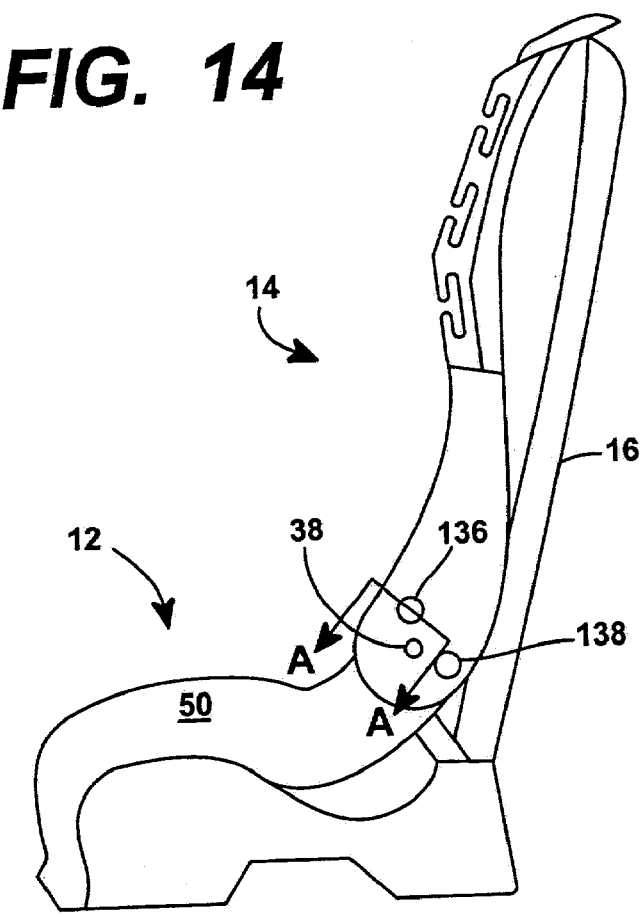
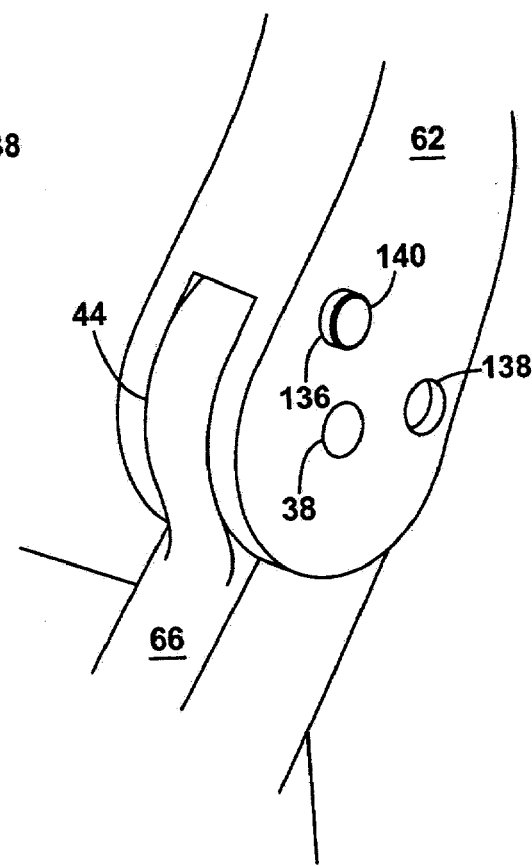
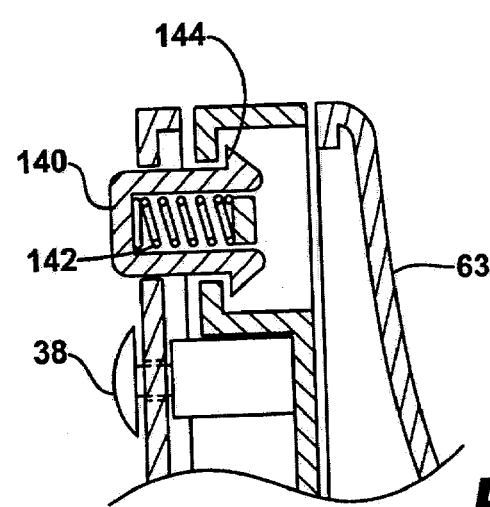
FIG. 14
FIG. 16
FIG. 15

FOLDABLE BOOSTER CAR SEAT

TECHNICAL FIELD

The invention relates generally to a folding belt positioning juvenile booster car seat that folds compactly for easy transportation, thereby reducing shipping costs as well as physical space requirements at the retail level.

BACKGROUND OF THE INVENTION

Passenger restraint systems in automobiles are generally well suited to properly restrain adults but not well suited to properly restrain children. Accordingly, vehicle restraint systems must be supplemented by devices such as booster seats, which may be broadly defined as a seat that relies primarily on the vehicle's lap and shoulder belts to retain the seat in the vehicle and to restrain the child's torso. These seats include a seat portion to elevate the child above the vehicle's seating surface to a position in which the vehicle's shoulder belt is better positioned on the child and which properly positions the vehicle lap belt on the child's torso, and may also include a back portion. A common construction technique for booster seats with backs is to mold the seat and back portions from rigid plastic and cover them with a cushion or pad.

Known booster seat designs suffer from several drawbacks. First, the large L-shaped bodies tend to be relatively expensive and difficult to mold in one piece, especially if the seat includes wings and a lap belt path. Additionally, these booster seat designs suffer from a large size which is difficult to ship, store, package for manufacturers, and difficult to store and transport for consumers.

The manufacturing expense associated with a rigid molded body derives from the complex molding process required. One solution is to mold the seat as a plurality of separate, less complex, pieces and assemble the separate pieces into a rigid whole. Unfortunately, molding the seat as separate pieces requires additional tooling to mold the separate pieces and adds assembly steps, both of which add to the cost of manufacture. Thus, the savings due to less complex molding is offset by increased manufacturing and assembly costs and the seat is still large and bulky.

Therefore, what has been lacking in the industry is an easy to manufacture L-shaped car seat which is easily collapsed or foldable from an L-shaped position to a more compact position for ease of transportation and storage, yet which can be similarly, easily unfolded to its L-shaped use position.

SUMMARY OF THE INVENTION

The general configuration for a belt-positioning booster car seat is typically a molded plastic seat with a back and a seating surface. These surfaces have adjacent side walls that help contain and protect the child occupant. Slots or recesses on both sides of the seat in the occupants' hip area receive the lap belt portion of an auto belt restraint. Hooks or slots on both sides of the seat on the head/shoulder area receive the shoulder belt portion of the auto restraint in multiple height positions. The booster seat positions the auto belts to properly restrain the small occupant. The shoulder belt is especially important and the clips or slots on the shoulder area of the booster, when used properly, guide the belt across the occupants' shoulder and not on the head or neck. The lap belt is equally important and the slots in the hip area guide the lap belt across the bony pelvis, not the soft abdomen area.

This folding booster is comprised of two main molded components, the seat and back sections. They are joined at a main pivot directly behind and slightly above the lap belt recesses. This pivot allows the back and seat sections to fold toward each other, permitting the seat to be transported more easily than a non-folding seat because of the smaller size. This reduction in size requires a package roughly half the size of a typical non-folding seat, which is very beneficial for packaging and freight cost savings as well as minimizing retail shelf space at the consumer store location.

Two spring-biased latches located on each side of the back section, just above the main pivot maintain the back and seat in a folded or unfolded position. The latches engage recesses molded into hubs on the seat section that are configured concentrically around the hub and the main pivot. The latches and surrounding structure are shaped such that the user must grip the latch and the surrounding area of the seat back section at the same time. Squeezing the latch compresses the spring and disengages the hub. Both latches must be disengaged at the same time to release the hubs which rotate freely as long as the latches are depressed. Since the act of releasing the hubs involves gripping the seat and latches simultaneously, folding is very easy as the user already has a grip on the seatback and can readily maneuver it.

As the seat back folds toward the seating surface, the latches engage, via the springs, different recesses in the hubs, holding the seat in its folded position. To unfold the seat to the usable position, both latches must be depressed simultaneously and the seat and back sections can be rotated away from each other to their original position.

When the seat is in the folded position, it can stand on its own and be carried like a suitcase with a handle molded into the top of the seatback. Alternatively, the carrier can grip the folded seat under the front bottom edge of the seat section or with the folded seat turned on its side, under either armrest portion of the seat section.

In one aspect of the present invention, the foldability of the car seat permits ease of transportation, economical packaging, shipping and low retail shelf space requirements and consumer benefits from the standpoint of ease of transporting the car seat from location to location.

These and other objects of the present invention will become more readily apparent from a reading of the following detailed description taken in conjunction with the accompanying drawings wherein like reference numerals indicate similar parts, and with further reference to the appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 7 is a front perspective view of an alternative embodiment of the invention showing a bottom mounted latch release;

FIG. 7a is a perspective view of an alternative embodiment of a hinge connecting the two portions of the car seat;

FIG. 8 is a side elevational view of FIG. 7 in partial cut-away showing the bottom mounted latch release;

FIG. 9 is a side elevational view of an alternative embodiment of the invention showing a top mounted latch release in partial cut-away;

FIG. 10 is a side elevational view of an alternative embodiment of the invention showing a top mounted latch release which uses a rocker arm;

FIG. 14 is side elevational view of an alternative embodiment of the invention showing a button release latch positionable into one of two different locations;

FIG. 15 is an enlarged cross-sectional view of the button release latch of FIG. 14 taken along line A—A; and FIG. 16 is an enlarged perspective view of the release latch positionable into one of two different locations of FIG. 14.

DETAILED DESCRIPTION OF THE INVENTION

Figure 1:
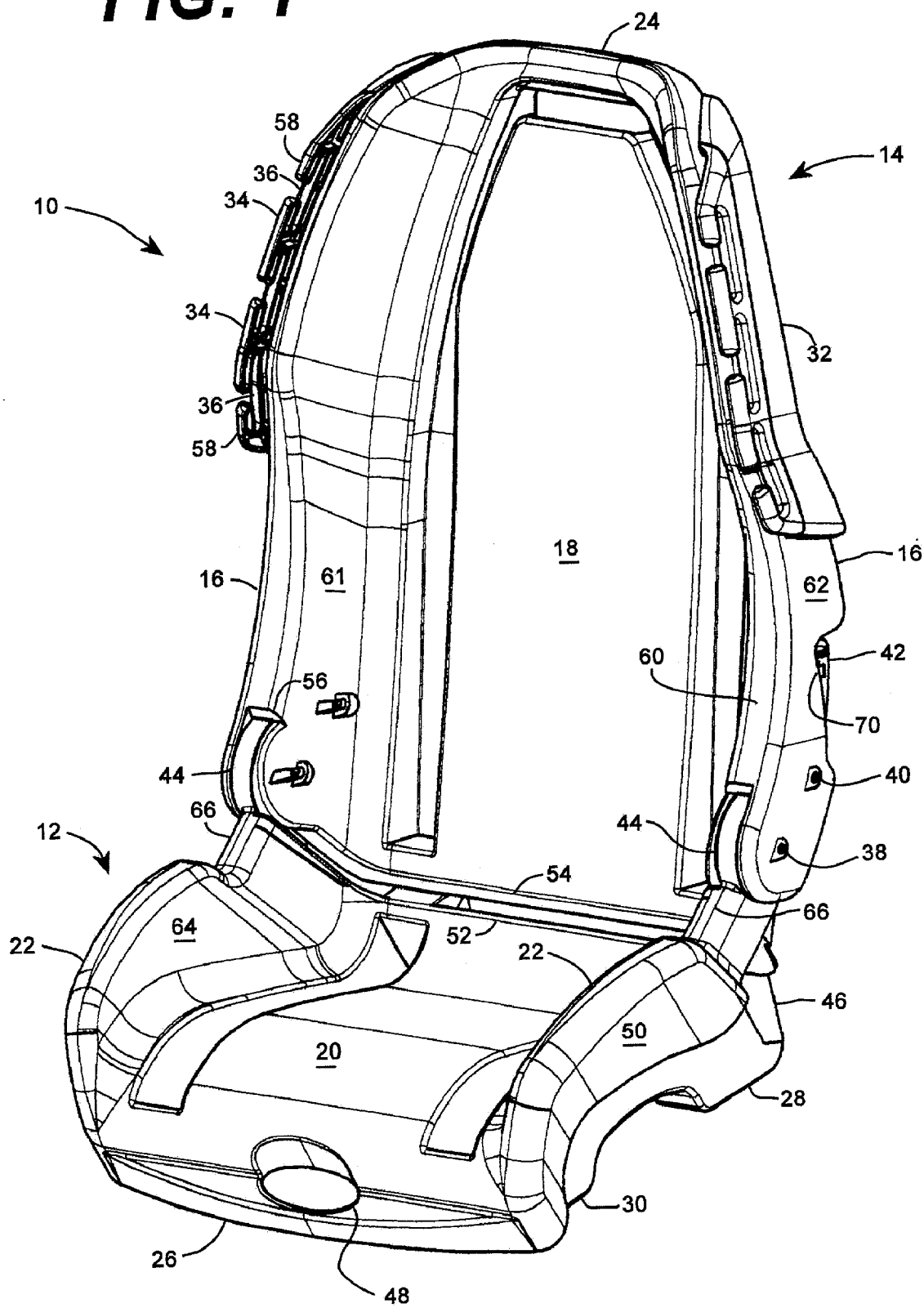
FIG. 1 is a front perspective view of a foldable car seat.
Figure 2:
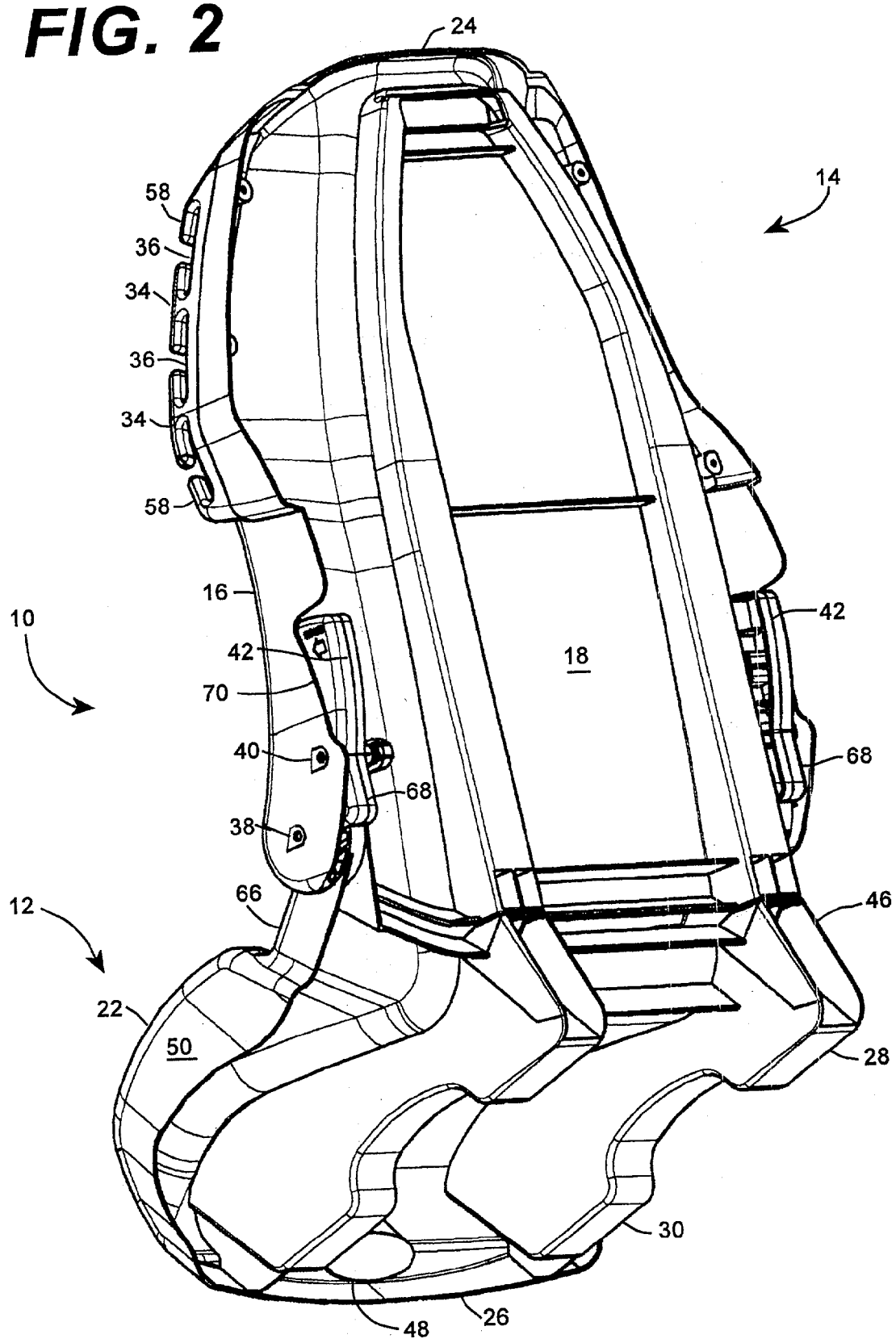
FIG. 2 is a rear perspective view of the foldable car seat of FIG. 1.
Figure 3:
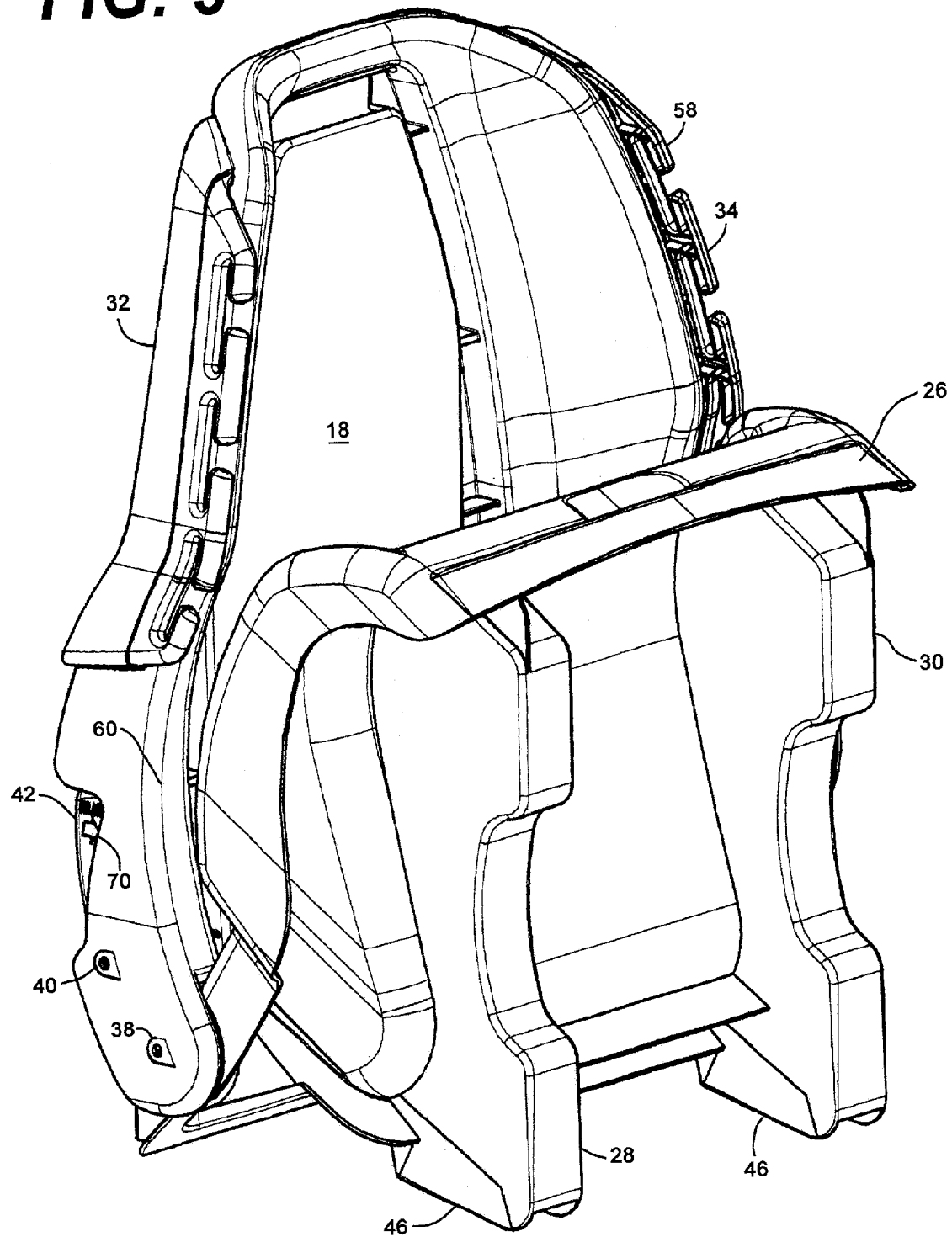
FIG. 3 is a front perspective view of the car seat of FIG. 1 in a collapsed position.
Figure 4:
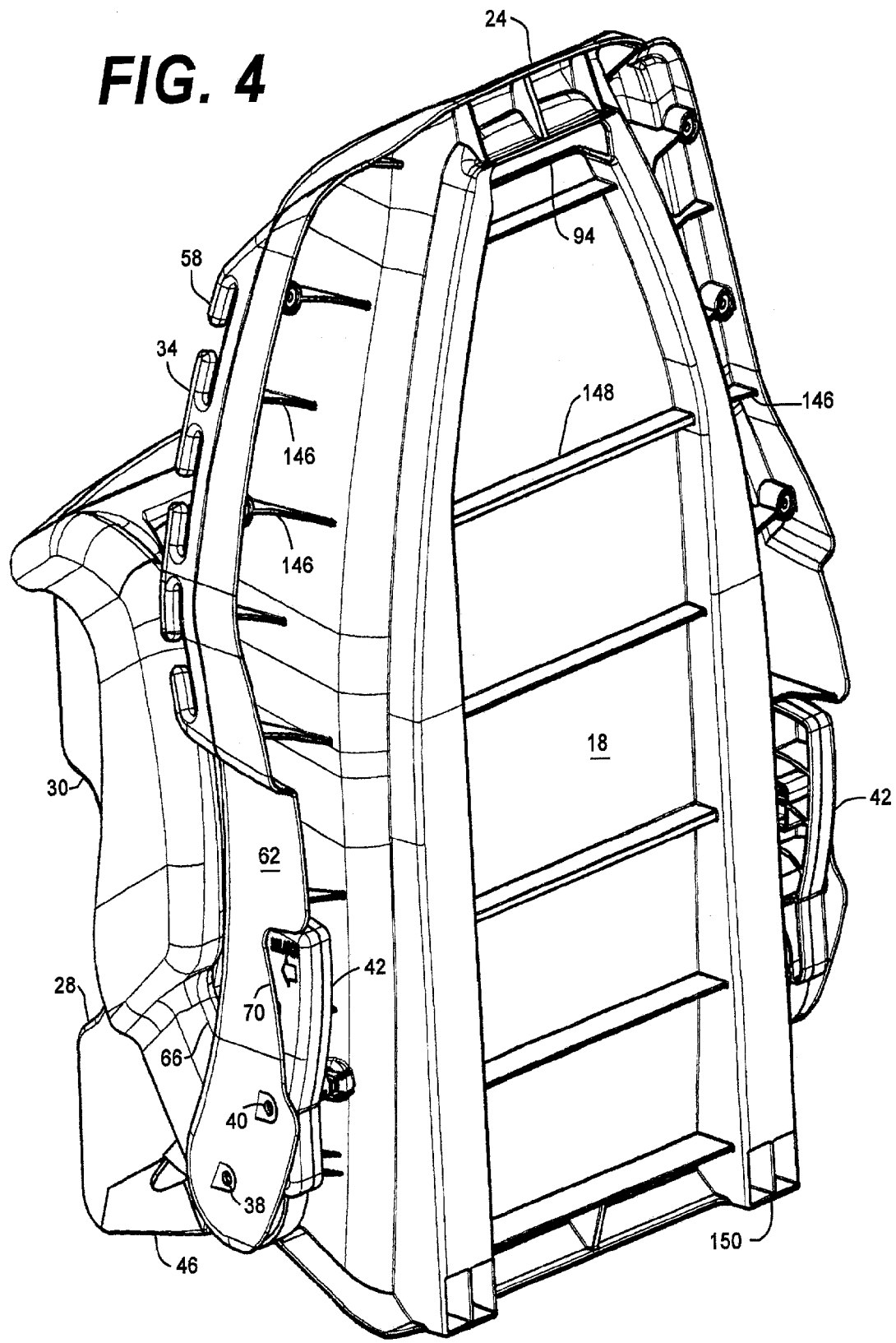
FIG. 4 is a rear perspective view of the cars seat of FIG. 1 in a collapsed position.

Referring now to the drawings wherein the showings are for purposes of illustrating the preferred embodiment of the invention only and not for purposes of limiting the same, FIGS. 1 through 6 show one embodiment of this invention wherein depression of a pair of pivotable handles selectively permit pivotable rotational movement from a first position into a second position, thereby collapsing or folding the car seat. The car seat 10 has a back member 14 and a seat member 12, the two members pivotally connected by main pivot pin 38. Back member 14 further comprises a seat back 18, with reinforcing ribs 148 on a back side, a pair of raised seat back sides 16, a slightly raised top ledge 24 and a seat back bottom edge 54. Each seat back side 16 is generally hollow having an exterior side 62, a top side 60 and an interior side 61, said hollow interior being generally contiguous with top ledge 24. Optionally, a plurality of ribs 146 are interspersed between the interior 61 and exterior 62 sides for additional structural integrity. In this embodiment, each seat back side 16 has a yoke portion 56 for accommodating pivotal rotational movement of a yoke insertion member 44 and permitting top side portion 66 of seat member raised side portion 50 to be positioned in close proximity to raised seat back sides 16 by clockwise rotational movement of seat member 12 toward back member 14. Phrased alternatively, and equivalently, the rotational movement may be thought of as counterclockwise if back member 14 is rotated toward seat member 12.

Each seat back side 16 has a seat belt guiding device 32 affixed to an upper portion of exterior side 62. Each guiding device has a pair of inwardly facing hook-like members 58 at opposed ends of the device defining at least one slot. Optionally and preferably, the device will have at least one T-shaped member 34 between said hook-like members for defining a slot 36 into which a shoulder belt (not shown) may be inserted to as to properly be located upon an occupant seated in the car seat. Optionally, shoulder belt guiding device may be configured so as to permit vertical axial sliding movement on seat back sides 16. Additionally, the lap belt is guided and positioned appropriately on a user's pelvic area by recessed areas 66 on either side of seat member 12.

Seat member 12 further comprises a curvilinear seat bottom 20, a pair of raised bottom sides 22, each side generally being hollow and having an exterior side 50, a front top side 22, a lowered or recessed rear top side 66, an interior side 64, a front 26 and a rear 52. At the base of seat member 12 is a pair of front leg members 30 and a pair of rear leg members 28, each of the rear leg members having a back member 46 for physical contact with a surface for standing when seat member 12 is rotated into a collapsed position in conjunction with base 150 of seat member 14 illustrated in FIG. 5. Seat member 12 optionally has a recessed and cut-out portion 48.

Each seat back side 16 of seat back member 14 additionally has a rotatable latch handle 42 pivotable about latch handle pivot pin 40 which is biased by biasing means 152 in a normally outward position. Positioned within yoke 56 is yoke insertion member 44, which is typically a notched or slotted wheel, having at least one, preferably at least two defined engagement slots 80, 82 for mating insertion of a male insertion member 68 affixed to one end of latch handle 42 when the handle is in the non-retracted position. Compressive counterclockwise movement of latch handle 42 about latch pivot pin 40 into side frame recess 70 releases the male insertion member 68 from one of mating slots 80 or 82 and permits free rotational movement of seat member 12, or back member 14 depending on the reference location, bout main pivot pin 38. Releasing clockwise movement of latch handle 42 re-engages male insertion member 68 into mating slots 80 or 82. It is understood that in the embodiment where only one slot is within insertion member 44, that slot 80 is the essential slot. While a slotted arrangement has been described, it is envisioned that serrated gear and pawl arrangement is within the scope of this invention.

Figure 5:
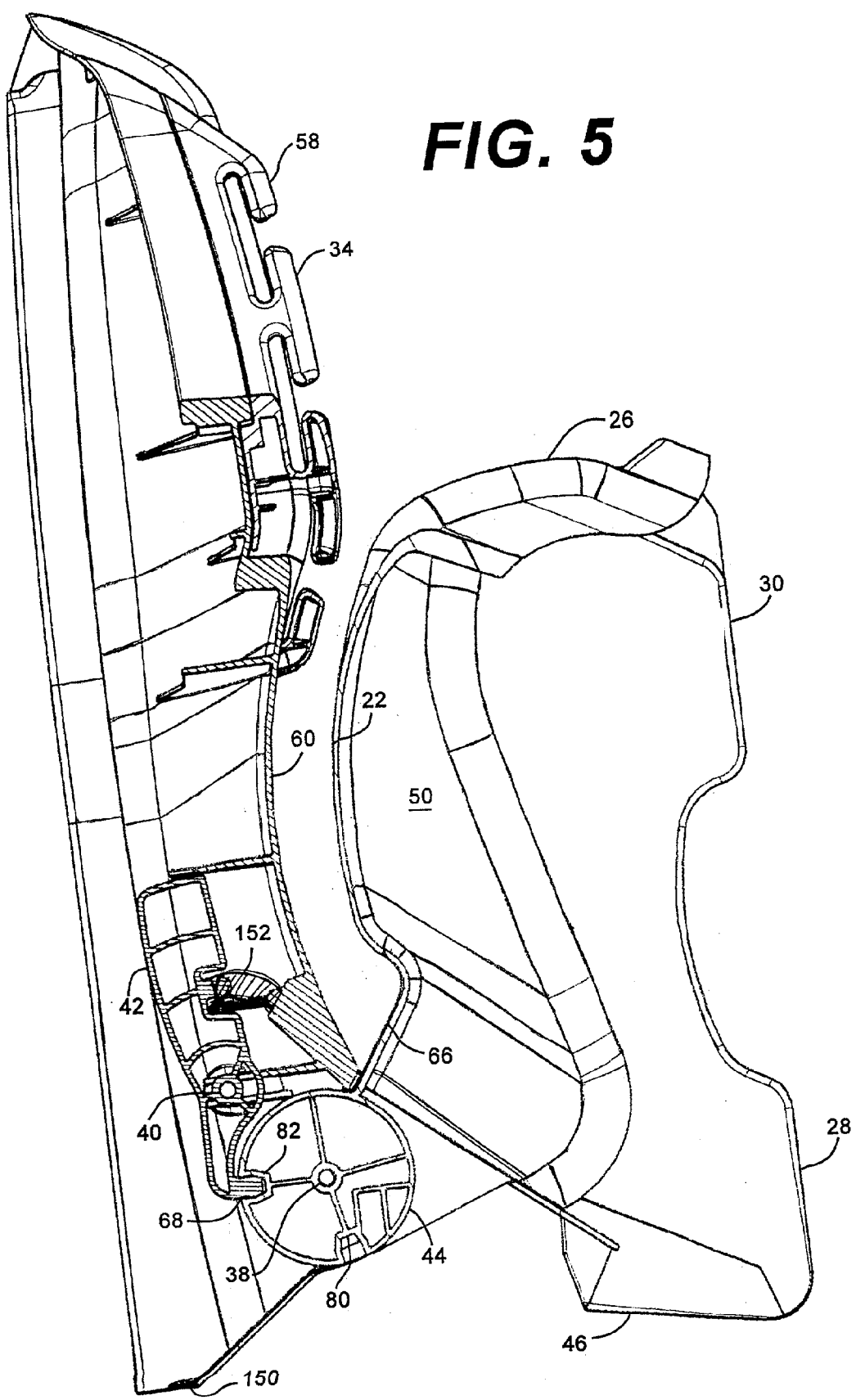
FIG. 5 is a side elevational view of the car seat of FIG. 1 shown in a collapsed position with the latch mechanism shown in cross-section.
Figure 6:
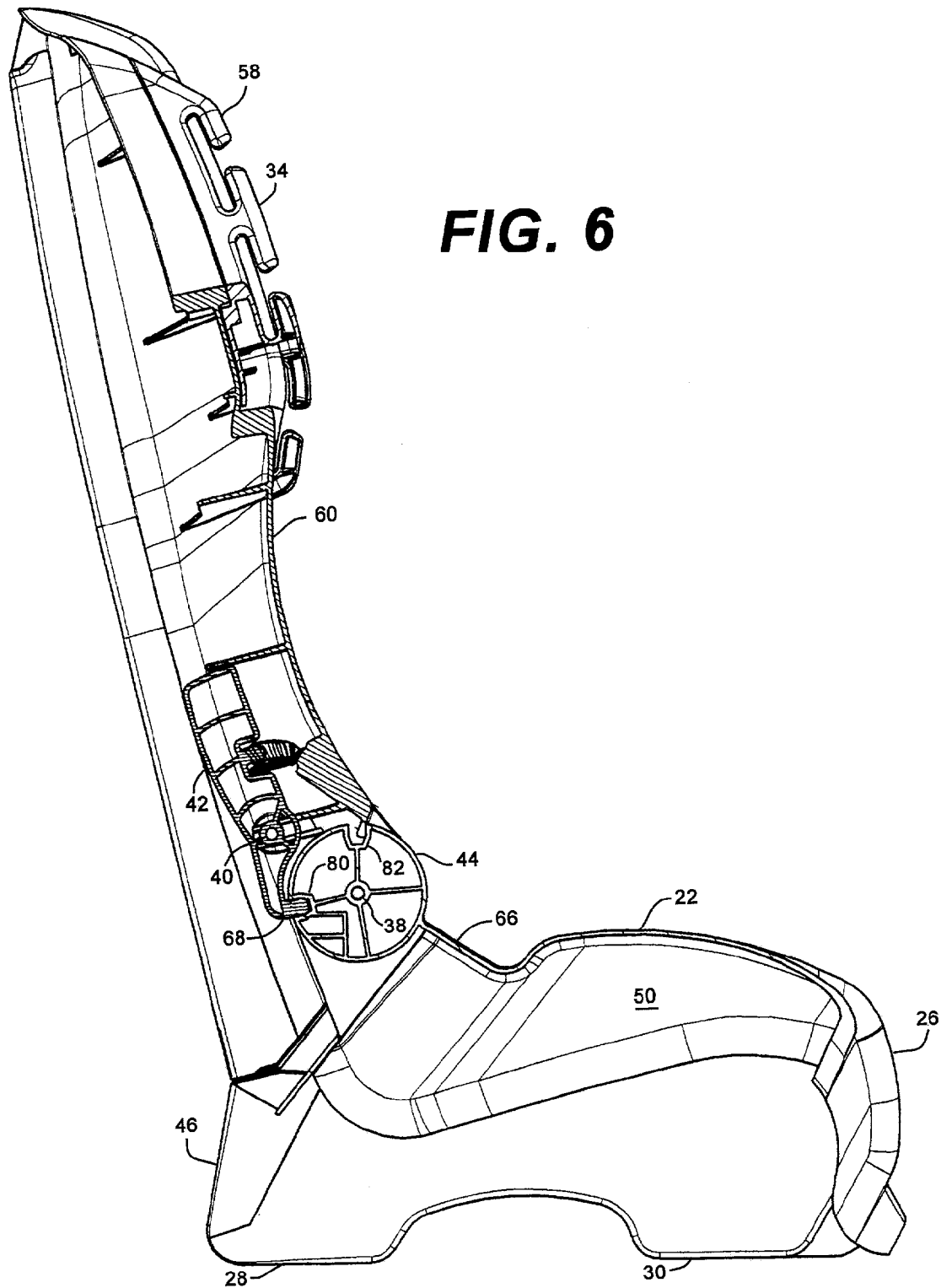
FIG. 6 is a side elevational view of the car seat of FIG. 5 shown in an open position with the latch mechanism shown in cross-section.

In order to further minimize space requirements of car seat 10, as illustrated in FIG. 5, the curvilinear shape of front top side 22 is essentially duplicated by the curvilinear shape of top side 60 of seat back 14.

FIG. 9 illustrates another embodiment of this invention wherein a top-mounted latch release is illustrated in contrast to the rear-mounted latch release shown in FIGS. 1–6. In this embodiment, a pair of elongated handles 76 are positioned within the hollow wells of back seat sides 16, each of said handles in connected engagement with each other via connecting top segment 94. Each of the handles is downwardly biased by spring 74 in contact with internal ledge 72. Upward longitudinal axial compression effected by upward movement of top segment 94, handle tip 78 is retracted from its fully extended engagement position so as to permit pivotal counterclockwise rotational movement of back member 14 toward seat member 12 with subsequent reinsertion of handle tip 78 into mating recess 82. While elongated handles 76 are shown in the figure, it is equally applicable that these handles could be replaced by cables which would extend from the release handle 94 down each side of the back to two small spring biased plungers that engage the slots on the seat. The plungers are released by pulling the handle in an upward direction.

FIG. 10 illustrates yet another embodiment of this invention wherein a top-mounted latch release is illustrated which utilizes a rocker arm arrangement. In this embodiment, upward longitudinal axial movement of elongated handle 76 effects counterclockwise rotational movement about pivot pin 40 by physical contact with a slightly beveled projection 86 on rocker arm 84, thereby retracting a second projection 88 and permitting counterclockwise rotational movement of back member 14 toward seat member 12 with subsequent reinsertion of second projection 88 into mating recess 82 through the biasing force effected by spring 90 coupled downward longitudinal axial movement of elongated handle member 76 by release of top segment 94. As described with reference to FIG. 9, it is equally applicable that the handle member could be replaced by cables and the dual notch arrangement could be replaced by a single notch arrangement described previously. In yet another embodiment, the rocker arm is pivotally connected to handle 76 via pivot pin 152 illustrated in FIG. 10*a*.

FIGS. 7–8 illustrate still yet another embodiment of this invention wherein a bottom-mounted latch release is illustrated which once again utilizes a rocker arm arrangement. In this embodiment, upward movement of a first end 96 of rocker arm 104 effects downward movement of projection 108 on a second end of the rocker arm, thereby disengaging from contact with mating slot 112 in slotted yoke insertion wheel 100, thereby permitting counterclockwise rotational movement of back member 14 toward seat member 12 with subsequent reinsertion of projection 108 into mating recess 110 by the biasing force effected by spring 102 on rocker arm 104. It is noted that in this embodiment, the yoke arms 96 and yoke insertion member 100 are essentially the opposite from that described for the embodiment shown in FIGS. 1–6, thereby illustrating the interchangeability of this arrangement. It is once again recognized that the two notch arrangement may be interchangeably replaced with the one notch arrangement discussed previously. It is also easily recognized that the yoke arrangement is also interchangeable with the non-yoke arrangement illustrated in FIG. 7*a*, and that this arrangement is applicable to all of the embodiments shown in FIGS. 1–16.

Figures 11, 12, 13:
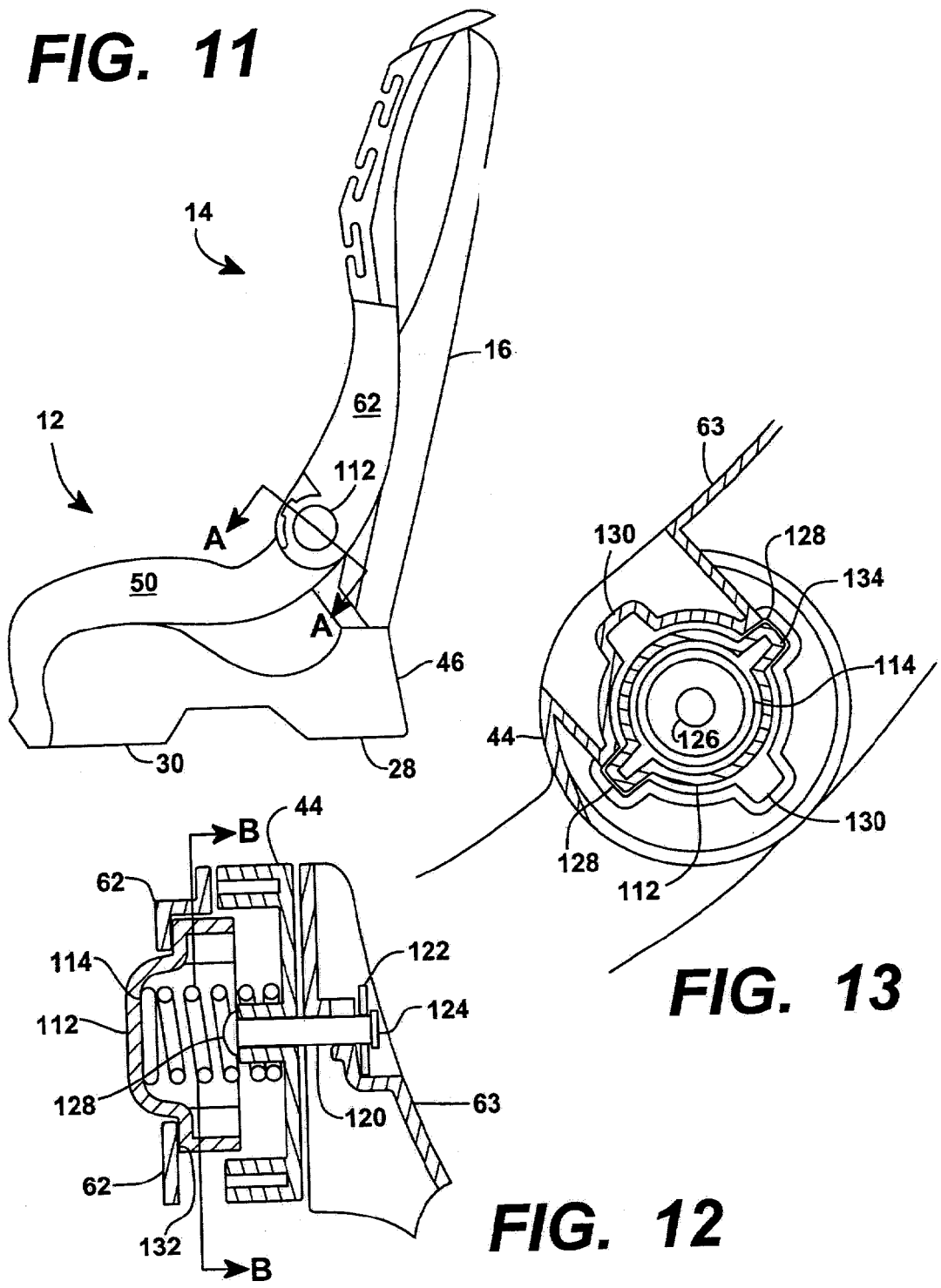
FIG. 11 is a side elevational view of an alternative embodiment of the invention showing a button release latch.
FIG. 12 is an enlarged cross-sectional view of the button release latch of FIG. 11 taken along line A—A.
FIG. 13 is an enlarged cross-sectional view of the button release latch of FIG. 12 taken along line B—B.
Figure 6:
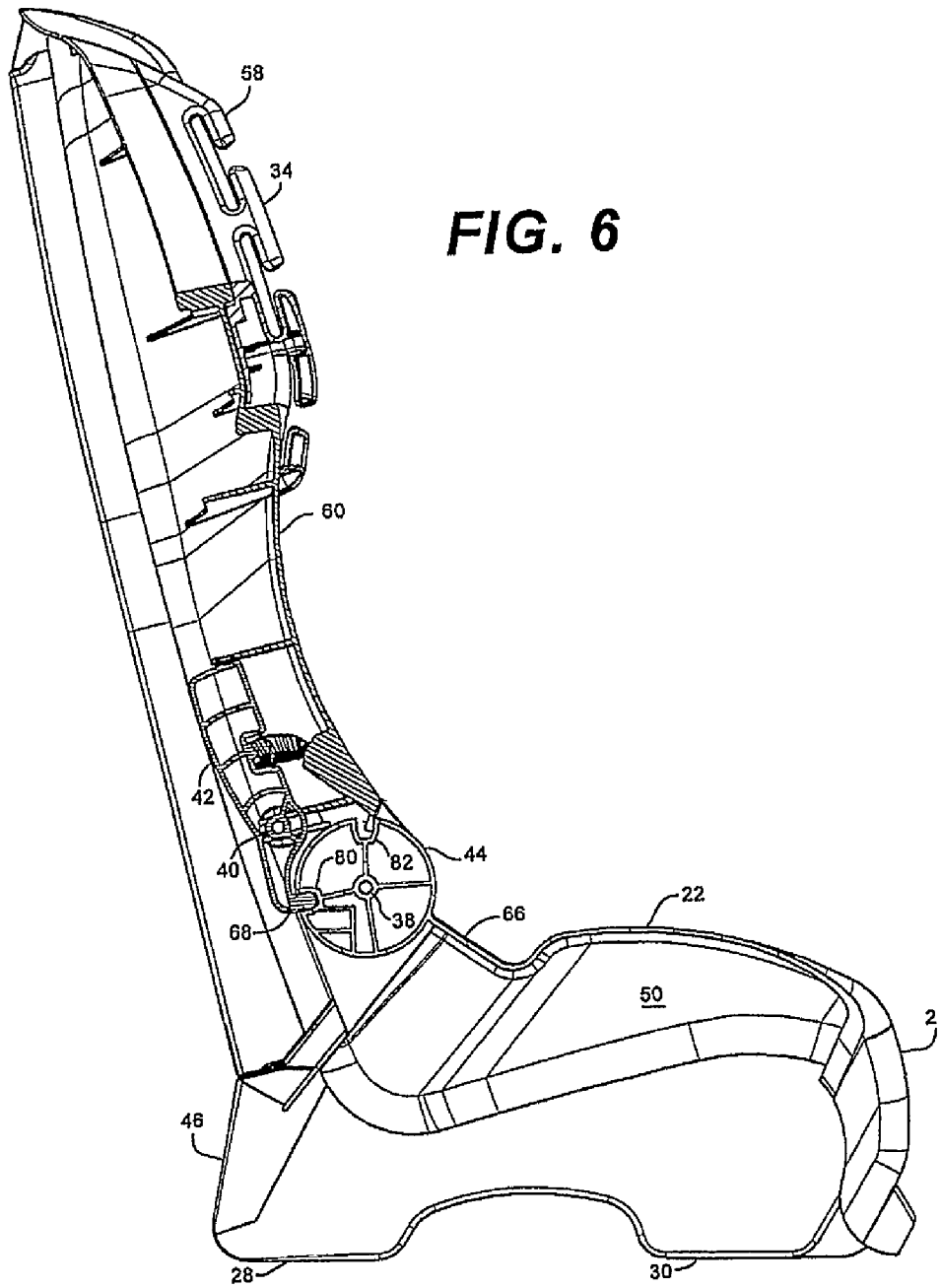

FIGS. 11–13 illustrate one embodiment of a push-button release latch 112. Concentric to the pivot axis of the main pivot hinge 120, each pivot hinge or rivet having a head 126 and a retaining flange 124, is a relatively large button 112 which protrudes outwardly from either exterior side 62 of seat back sides 16. Each button is generally circular with at least one, preferably a pair of laterally-extending wings 132 to retain the button within the housing, each button being outwardly biased due to spring 114 within the housing. To release the seat member 12 from back member 14, each button must be depressed against the spring bias, thereby releasing the interlocking details which consist of at least one, preferably a pair of protrusions 134 in mating receptacles 128. When sufficient rotational movement has been achieved that seat member 12 is adjacent back member 14, the depressive force is removed and the seat and back members are retained in their collapsed position due to the interfacing of the newly positioned protrusions 134 in mating receptacle 130. It is recognized that in this arrangement, it is minimally required that the at lest one laterally extending wing 132 be capable of mating with at least one mating receptacle 128, and that the incorporation of additional wings and mating receptacles are optional.

FIGS. 14–16 illustrate yet another embodiment of a push-button release latch 140 retained in place by wings 144. In this configuration, push-button 140 is illustrated to be capable of insertion into either open position hole 136 or collapsed position hole 138 by rotation about main pivot 38. Depression of button 140 which is outwardly biased by spring 142, permits counterclockwise rotational movement of back member 14 toward seat member 12. While two openings, 136 and 138 are illustrated, it is recognized that it is only critical that there be an open position hole 136, although it is preferred that the collapsed position hole 138 be present.

In manufacture, the car seat 10 is typically made of plastic, preferably polyolefin, more preferably rubber modified polypropylene and covered with a fabric, typically including a foamed backing material for the occupant. A non-exhaustive list of possible plastics would include polyolefins, polycarbonates, polyesters, polyurethanes, polyalkylene terephthalates, polysulfones, polyimides, polyphenylene ethers, styrenic polymers, polycarbonates, acrylic polymers, polyamides, polyacetals, halide containing polymers and polyolefin homopolymers and copolymers. Additionally included would be mixtures of different polymers, such as polyphenylene ether/styrenic resin blends, polyvinylchloride/ABS or other impact modified polymers, such as methacrylonitrile containing ABS, and polyester/ABS or polyester plus some other impact modifier may also be used. Such polymers are available commercially or may be made by means well known in the art.

More specifically, polymers of monoolefins and diolefins, for example would include polypropylene, polyisobutylene, polybutene-1, polymethylpentene-1, polyisoprene or polybutadiene, as well as polymers of cycloolefins, for instance of cyclopentene or norbornene, polyethylene (which optionally can be crosslinked), for example high density polyethylene (HDPE), low density polyethylene (LDPE) and linear low density polyethylene (LLDPE) may be used. Mixtures of these polymers, for example mixtures of polypropylene with polyisobutylene, polypropylene with polyethylene (for example PP/HDPE), may also be used. Also useful are copolymers of monoolefins and diolefins with each other or with other vinyl monomers, such as, for example, ethylene/propylene, LLDPE and its mixtures with LDPE, propylene/butene-1, ethylene/hexene, ethylene/ethylpentene, ethylene/heptene, ethylene/octene, propylene/butadiene, isobutylene/isoprene, ethylene/alkyl acrylates, ethylene/alkyl methacrylates, ethylene/vinyl acetate (EVA) or ethylene/acrylic acid copolymers (EAA) and their salts (ionomers) and terpolymers of ethylene with propylene and a diene, such as hexadiene, dicyclopentadiene or ethylidene-norbornene; as well as mixtures of such copolymers and their mixtures with polymers mentioned above, for example polypropylene/ethylene-propylene copolymers, LDPE/EVA, LDPE/EAA, LLDPE/EVA and LLDPE/EAA.

Thermoplastic polymers may also include styrenic polymers, such as polystyrene, poly-(p-methylstyrene), poly-(α-methylstyrene), copolymers of styrene or .alpha.-methylstyrene with dienes or acrylic derivatives, such as, for example, styrene/butadiene, styrene/acrylonitrile, styrene/alkyl methacrylate, styrene/maleic anhydride, styrene/butadiene/ethyl acrylate, styrene/acrylonitrile/methacrylate; mixtures of high impact strength from styrene copolymers and another polymer, such as, for example, from a polyacrylate, a diene polymer or an ethylene/propylene/diene terpolymer; and block copolymers of styrene, such as, for example, styrene/butadiene/styrene, styrene/isoprene/styrene, styrene/ethylene/butylene/styrene or styrene/ethylene/propylene/styrene. Styrenic polymers may additionally or alternatively include graft copolymers of styrene or a-methylstyrene such as, for example, styrene on polybutadiene, styrene on polybutadiene-styrene or polybutadiene-acrylonitrile; styrene and acrylonitrile (or methacrylonitrile) on polybutadiene; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures of with the styrenic copolymers indicated above.

Nitrile polymers are also useful in the polymer composition of the invention. These include homopolymers and copolymers of acrylonitrile and its analogs such as methacrylonitrile, such as polyacrylonitrile, acrylonitrile/butadiene polymers, acrylonitrile/alkyl acrylate polymers, acrylonitrile/alkyl methacrylate/butadiene polymers, acrylonitrile/butadiene/styrene (ABS), and ABS which includes methacrylonitrile.

Polymers based on acrylic acids, include acrylic acid, methacrylic acid, methyl methacrylate acid and ethacrylic acid and esters thereof may also be used. Such polymers include polymethylmethacrylate, and ABS-type graft copolymers wherein all or part of the acrylonitrile-type monomer has been replaced by an acrylic acid ester or an acrylic acid amide. Polymers including other acrylic-type monomers, such as acrolein, methacrolein, acrylamide and methacrylamide may also be used.

Halogen-containing polymers may also be useful. These include resins such as polychloroprene, epichlorohydrin homopolymers and copolymers, polyvinyl chloride, polyvinyl bromide, polyvinyl fluoride, polyvinylidene chloride, chlorinated polyethylene, chlorinated polypropylene, fluorinated polyvinylidene, brominated polyethylene, chlorinated rubber, vinyl chloride-vinylacetate copolymer, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride tercopolymer, vinyl chloride-styrene-acrylonitrile copolymer, vinyl chloride-isoprene copolymer, vinyl chloride-chlorinated propylene copolymer, vinyl chloride-vinylidene chloride-vinyl acetate tercopolymer, vinyl chloride-acrylic acid ester copolymers, vinyl chloride-maleic acid ester copolymers, vinyl chloride-methacrylic acid ester copolymers, vinyl chloride-acrylonitrile copolymer and internally plasticized polyvinyl chloride.

Other useful thermoplastic polymers include homopolymers and copolymers of cyclic ethers, such as polyalkylene glycols, polyethylene oxide, polypropylene oxide or copolymers thereof with bis-glycidyl ethers; polyacetals, such as polyoxymethylene and those polyoxymethylene with contain ethylene oxide as a comonomer; polyacetals modified with thermoplastic polyurethanes, acrylates or methacrylonitrile containing ABS; polyphenylene oxides and sulfides, and mixtures of polyphenylene oxides with polystyrene or polyamides; polycarbonates and polyester-carbonates; polysulfones, polyethersulfones and polyetherketones; and polyesters which are derived from dicarboxylic acid and diols and/or from hydroxycarboxylic acids or the corresponding lactones, such as polyethylene terephthalate, polybutylene terephthalate, poly-1,4-dimethyliol-cyclohexane terephthalate, poly-[2,2,4-(4-hydroxyphenyl)-propane] terephthalate and polyhydroxybenzoates as well as block copolyetheresters derived from polyethers having hydroxyl end groups.

Polyamides and copolyamides which are derived from diamines and dicarboxylic acids and/or from aminocarboxylic acids or the corresponding lactams, such as polyamide-4, polyamide-6, polyamide-6/6, polyamide-6/10, polyamide-6/9, polyamide-6/12, polyamide-4/6, polyamide-11, polyamide-12, aromatic polyamides obtained by condensation of m-xylene, diamine and adipic acid; polyamides prepared from hexamethylene diamine and isophthalic and/or terephthalic acid and optionally an elastomer as modifier, for example, poly-2,4,4-trimethylhexamethylene terephthalamide or poly-m-phenylene isophthalamide may be useful. Further copolymers of the aforementioned polyamides with polyolefins, olefin copolymers, ionomers or chemically bonded or grafted elastomers; or with polyethers, such as for instance, with polyethylene glycol, polypropylene glycol or polytetramethylene glycols, and polyamides or copolyamides modified with EPDM or ABS may be used.

This invention has been described in detail with reference to specific embodiments thereof, including the respective best modes for carrying out each embodiment. It shall be understood that these illustrations are by way of example and not by way of limitation. Accordingly, the scope and content of the present invention are to be defined only by the terms of the appended claims.

What is claimed is:

1. A transportable collapsible car seat for use with a passenger restraint system comprising a shoulder belt and a lap belt which comprises:
   (a) a plastic seat back member having a top and a bottom and a pair of raised curvilinear sides, each seat back member side having a curvilinear profile from said top to said bottom, each side having a shoulder belt positioning member for use with said shoulder belt of said restraint system toward a top of said side;
   (b) a plastic seat member having a front and a back and a pair of raised curvilinear sides, each member side having a curvilinear profile from said front to said back;
   (c) a means for selectively positioning and securing said seat member from an essentially L-shaped first position to a second essentially collapsed position wherein said top of said seat member is adjacent to said front of said back member and wherein said curvilinear profile of said raised curvilinear sides of said seat member are essentially in inverse relationship when adjacent to said curvilinear profile of said raised curvilinear sides of said back member in said second collapsed position, a lateral distance between said sides of both said seat member and said back member being about the same;
   (d) a means on said seat member for positioning said lap belt of said restraint system across the bony pelvis of an occupant; and
   (e) a pivot means connecting said seat back member with said seat member, said pivot means positioned such that when said collapsible car seat is in said second essentially collapsed position, said bottom of said seat back member and said back of said seat member are essentially in a horizontal plane permitting said collapsible car seat to be in an essentially vertical upright position.

2. The seat of claim 1 wherein:
   (a) said lap belt positioning means is an indentation member in each of said curvilinear sides at a back of said seat member.

3. The seat of claim 2 wherein said shoulder belt positioning member further comprises
   (a) at least one inwardly facing hook-shaped member.

4. The seat of claim 3 wherein said shoulder belt positioning member further comprises
   (a) at least one T-shaped member between at least two inwardly facing hook-shaped members.

5. The seat of claim 1 wherein said means for selectively positioning comprises
   (a) a yoke having two arms and an aperture disposed through each arm of said yoke;
   (b) an insertion member having an aperture disposed therein and dimensioned to fit within said arms of said yoke, said insertion member having at least one indentation about a periphery of said insertion member; and
   (c) a means for selectively engaging said at least one indentation.

6. The seat of claim 5 wherein
   (a) said insertion member has at least two indentations, and
   (b) said means for selectively engaging is a means for selectively engaging said at least two indentations.

7. The seat of claim 5 wherein said means for selectively engaging comprises
   (a) a pivotable outwardly biased handle having a male projection for insertion into at least one indentation.

8. The seat of claim 7 wherein
   (a) said insertion member has at least two indentations, and
   (b) said pivotable outwardly biased handle has a male projection for insertion into each of said at least two indentations.

9. The seat of claim 5 wherein said means for selectively engaging comprises
   (a) a downwardly biased handle extending to a top of said seat member having a male projection for insertion into at least one indentation.

10. The seat of claim 9 wherein
    (a) said insertion member has at least two indentations, and
    (b) said handle has a male projection for insertion into each of at least two indentations.

11. The seat of claim 5 wherein said means for selectively engaging comprises
    (a) a handle extending to a top of said seat member; and
    (b) an outwardly biased rocker arm having
       (i) one male projection for insertion into at least one indentation on one end of the rocker arm; and
       (ii) one male projection for interfacing with a projection on said handle.

12. The seat of claim 11 wherein
    (a) said insertion member has at least two indentations, and
    (b) said one male projection is insertable into each of said at least two indentations.

13. The seat of claim 5 wherein said means for selectively engaging comprises
    (a) a downwardly biased rocker arm at a bottom of said seat member having a male projection for insertion into at least one indentation.

14. The seat of claim 13 wherein
    (a) said insertion member has at least two indentations, and
    (b) said male projection is insertable into each of said at least two indentations.

15. The seat of claim 5 wherein said means for selectively engaging comprises
    (a) an outwardly biased button member having at least one laterally extending male projection for insertion into said at least one indentation.

16. The seat of claim 15 wherein
    (a) said insertion member has at least two indentations, and
    (b) said button member has at least two laterally extending male projections for insertion into each of said at least two indentations.

17. The seat of claim 16 wherein
    (a) said at least two indentations are spaced at between about 45–135° with respect to each other.

18. The seat of claim 17 wherein
    (a) said at least two indentations are spaced at between about 75–105° with respect to each other.

19. The seat of claim 1 wherein said means for selectively positioning comprises
    (a) a yoke having two arms and an aperture disposed through each arm of said yoke and at least one additional aperture in an exterior arm of said yoke;
    (b) an insertion member having an aperture disposed therein and dimensioned to fit within said arms of said yoke, said insertion member having an outwardly biased button dimensioned to fit into said at least one additional aperture; and
    (c) a means for selectively engaging said at least one additional aperture.

20. The seat of claim 19 wherein
    (a) said exterior arm of said yoke has at least two additional apertures disposed therein; and
    (b) said means for selectively engaging comprises positioning of said button between said at least two additional apertures.

21. A transportable collapsible car seat for use with a passenger restraint system comprising a shoulder belt and a lap belt which comprises:
    (a) a plastic seat back member having a top and a bottom and a pair of raised curvilinear sides, each seat back member side having a curvilinear profile from said top to said bottom, each side having a shoulder belt positioning member for use with said shoulder belt of said restraint system toward a top of said side;
    (b) a plastic seat member having a front and a back and a pair of raised curvilinear sides, each member side having a curvilinear profile from said front to said back;
    (c) a means for selectively positioning and securing said seat member from an essentially L-shaped first position to a second essentially collapsed position wherein said top of said seat member is adjacent to said front of said back member and wherein said curvilinear profile of said raised curvilinear sides of said seat member are essentially in inverse relationship when adjacent to said curvilinear profile of said raised curvilinear sides of said back member in said second collapsed position, a lateral distance between said sides of both said seat member and said back member being about the same; and
    (d) a means for selectively engaging said means for positioning;
    (e) a means on said seat member for positioning said lap belt of said restraint system across the bony pelvis of an occupant; and
    (f) a pivot means connecting said seat back member with said seat member, said pivot means positioned such that when said collapsible car seat is in said second essentially collapsed position, said bottom of said seat back member and said back of said seat member are essentially in a horizontal plane permitting said collapsible car seat to be in an essentially vertical upright position.

22. The seat of claim 21 wherein:
    (a) said lap belt positioning means is an indentation member in each of said curvilinear sides at a back of said seat member.

23. The seat of claim 22 wherein said shoulder belt positioning member further comprises
 (a) at least one inwardly facing hook-shaped member.

24. The seat of claim 23 wherein said shoulder belt positioning member further comprises
 (a) at least one T-shaped member between at least two inwardly facing hook-shaped members.

25. The seat of claim 21 wherein said means for selectively positioning comprises
 (a) a yoke having an aperture disposed through each arm of said yoke; and
 (b) an insertion member having an aperture disposed therein and dimensioned to fit within said arms of said yoke, said insertion member having at least one indentation disposed about a periphery of said insertion member.

26. The seat of claim 25 wherein said means for selectively engaging comprises
 (a) a pivotable outwardly biased handle having a male projection for insertion into said at least one indentation.

27. The seat of claim 26 wherein
 (a) said insertion member has at least two indentations, and
 (b) said pivotable outwardly baised handle has a male projection for insertion into each of said at least two indentations.

28. The seat of claim 25 wherein said means for selectively engaging comprises
 (a) a handle extending to a top of said seat member; and
 (b) an outwardly biased rocker arm having
  (i) one male projection for insertion into at least one indentation on one end of the rocker arm; and
  (ii) one male projection for interfacing with a projection on said handle.

29. The seat of claim 28 wherein
 (a) said insertion member has at least two indentations and
 (b) said one male projection is insertable into each of said at least two indentations.

30. The seat of claim 25 wherein said means for selectively engaging comprises
 (a) a downwardly biased rocker arm at a bottom of said seat member having a male projection for insertion into said at least one indentation.

31. The seat of claim 30 wherein
 (a) said insertion member has at least two indentations, and
 (b) said male projection is insertable into each of said at least two indentations.

32. The seat of claim 25 wherein said means for selectively engaging comprises
 (a) an outwardly biased button member having at least one laterally extending male projections for insertion into said at least one indentation.

33. The seat of claim 32 wherein
 (a) said insertion member has at least two indentations, and
 (b) said button member has at least two laterally extending male projections for insertion into each of said at least two indentations.

34. The seat of claim 33 wherein
 (a) said at least two indentations are spaced at between about 45–135° with respect to each other.

35. The seat of claim 34 wherein
 (a) said at least two indentations are spaced at between about 75–105° with respect to each other.

36. The seat of claim 21 wherein said means for selectively positioning comprises
 (a) a yoke having an aperture disposed through each arm of said yoke and at least one additional aperture in an exterior arm of said yoke;
 (b) an insertion member having an aperture disposed therein and dimensioned to fit within said arms of said yoke, said insertion member having an outwardly biased button dimensioned to fit into said at least one additional aperture; and
 (c) a means for selectively engaging said at least one additional aperture.

37. The seat of claim 36 wherein
 (a) said exterior arm of said yoke has at least two additional apertures disposed therein; and
 (b) said means for selectively engaging comprises positioning of said button between said at least two additional apertures.

38. The seat of claim 21 wherein said means for selectively positioning comprises
 (a) a yoke having an aperture disposed through each arm of said yoke; and
 (b) an essentially circular gear having a plurality of teeth and an aperture therein, said gear dimensioned to fit within said arms of said yoke.

39. The seat of claim 21 wherein said means for selectively engaging comprises
 (a) a gear having teeth; and
 (b) a pivotable outwardly biased handle having a pawl to interface with said teeth of said gear.

40. The seat of claim 39 wherein said means for selectively engaging comprises
 (a) a downwardly biased handle extending to a top of said seat member having pawl interface with said teeth of said gear.

41. The seat of claim 39 wherein said means for selectively engaging comprises
 (a) a handle extending to a top of said seat member; and
 (b) an outwardly biased rocker arm wherein
  (i) a said pawl interfaces with said teeth of said gear on one end of the rocker arm and
  (ii) one male projection for interfacing with a projection on said handle.

42. The seat of claim 39 wherein said means for selectively engaging comprises
 (a) a downwardly biased rocker arm at a bottom of said seat member wherein said pawl interfaces with said teeth of said gear.

43. The seat of claim 39 wherein said means for selectively engaging comprises
 (a) a downwardly biased handle extending to a top of said seat member having a male projection for insertion into said at least one indentation.

44. The seat of claim 43 wherein
 (a) said insertion member has at least two indentations, and
 (b) said downwardly biased handle has a male projection for insertion into each of said at least two indentations.

* * * * *

UNITED STATES PATENT AND TRADEMARK OFFICE
CERTIFICATE OF CORRECTION

PATENT NO. : 7,229,132 B2
APPLICATION NO. : 10/259097
DATED : June 12, 2007
INVENTOR(S) : Paul Meeker and William R. Gibson It is certified that error appears in the above-identified patent and that said Letters Patent is hereby corrected as shown below:

Column 6, line 64, DELETE "a-methylstyrene" and substituting therefore
-- α-methylstyrene --

Claim 40, Column 12, line 37 INSERT the word --said-- between "having" and "pawl".

Delete Drawing sheet 6, and replace with drawing sheet 6. (attached)

Delete Drawing sheet 7, and replace with drawing sheet 7. (attached)

Signed and Sealed this

Fourth Day of December, 2007

JON W. DUDAS
*Director of the United States Patent and Trademark Office*

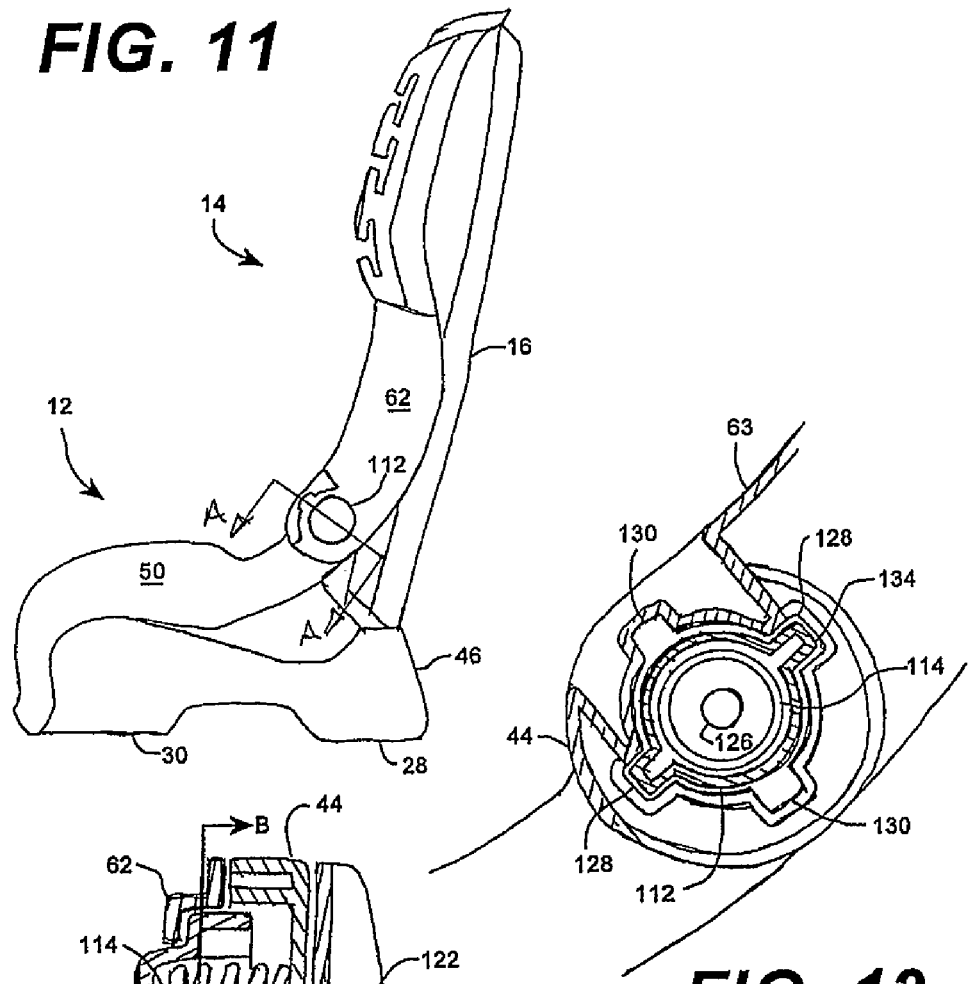
FIG. 11
FIG. 13
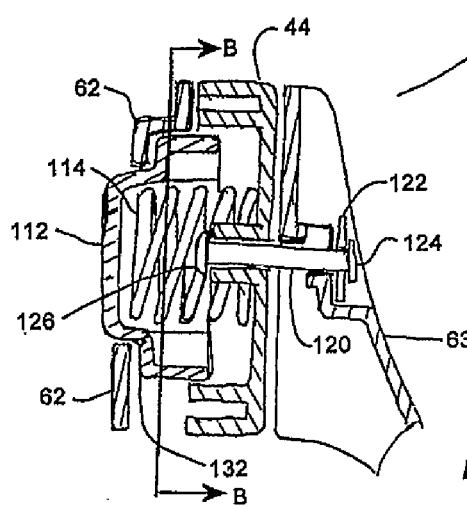
FIG. 12